US008693139B2

(12) United States Patent
Tian et al.

(10) Patent No.: US 8,693,139 B2
(45) Date of Patent: Apr. 8, 2014

(54) ULTRA-THIN HDD EMBEDDED DISK CLAMP DESIGN

(75) Inventors: Jifang Tian, Fremont, CA (US); Jian Yang, Fremont, CA (US); Qiang Yang, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/565,713

(22) Filed: Aug. 2, 2012

(65) Prior Publication Data
US 2014/0036392 A1 Feb. 6, 2014

(51) Int. Cl.
G11B 17/022 (2006.01)

(52) U.S. Cl.
USPC ...................................... 360/99.12

(58) Field of Classification Search
USPC ........................... 360/98.08, 99.12
See application file for complete search history.

(56) References Cited

U.S. PATENT DOCUMENTS

| | | | |
|---|---|---|---|
| 4,945,432 A | 7/1990 | Matsudaira et al. | |
| 5,422,768 A | 6/1995 | Roehling et al. | |
| 5,426,548 A | 6/1995 | Fujii et al. | |
| 5,459,627 A | 10/1995 | Peter | |
| 5,517,376 A | 5/1996 | Green | |
| 5,724,209 A | 3/1998 | Dunckley et al. | |
| 5,940,244 A | 8/1999 | Canlas et al. | |
| 5,982,581 A | 11/1999 | Kazmierczak et al. | |
| 6,055,123 A * | 4/2000 | Kazmierczak et al. | 360/98.08 |
| 6,208,486 B1 | 3/2001 | Gustafson et al. | |
| 6,282,054 B1 * | 8/2001 | Luo | 360/98.08 |
| 6,417,988 B1 | 7/2002 | Renken et al. | |
| 6,483,661 B1 | 11/2002 | Martin et al. | |
| 6,542,330 B1 * | 4/2003 | Choo et al. | 360/99.12 |
| 6,724,568 B1 | 4/2004 | Suwito et al. | |
| 6,807,721 B2 * | 10/2004 | Choo et al. | 29/603.03 |
| 6,888,699 B2 | 5/2005 | Drake et al. | |
| 6,961,216 B2 | 11/2005 | Chan et al. | |
| 7,057,852 B1 | 6/2006 | Butler et al. | |
| 7,126,787 B2 | 10/2006 | Chan et al. | |
| 7,181,824 B1 * | 2/2007 | Suwito et al. | 29/603.03 |
| 7,209,320 B1 | 4/2007 | Woods et al. | |
| 7,215,509 B2 * | 5/2007 | Ng | 360/99.12 |
| 7,239,476 B2 | 7/2007 | Chan et al. | |
| 7,511,919 B2 | 3/2009 | Suzuki et al. | |
| 7,545,601 B2 | 6/2009 | Hanada et al. | |
| 7,715,146 B2 * | 5/2010 | Ng et al. | 360/99.12 |
| 7,823,270 B2 * | 11/2010 | Choo et al. | 29/603.03 |
| 7,872,830 B2 * | 1/2011 | Ruden et al. | 360/99.12 |
| 8,336,179 B2 * | 12/2012 | Ruden | 29/283 |
| 2007/0230039 A1 | 10/2007 | Koizumi et al. | |
| 2007/0242388 A1 | 10/2007 | Goksel et al. | |
| 2012/0300344 A1 | 11/2012 | Brause et al. | |

* cited by examiner

Primary Examiner — Angel Castro

(57) ABSTRACT

A disk drive having a hub comprising a top surface and a non-circular protrusion extending upward from the top surface, a disk clamp comprising a wall portion and a non-circular opening formed through the clamp, the opening configured to receive the non-circular protrusion extending upward from the top surface of the hub; and at least one disk supported by the hub, wherein the non-circular protrusion extending upward from the top surface of the hub is inserted into the opening formed in the clamp, and wherein an outer annular portion of the clamp engages the disk to provide clamping force.

19 Claims, 7 Drawing Sheets

ULTRA-THIN HDD EMBEDDED DISK CLAMP DESIGN

FIELD

The present disclosure relates generally to information storage devices, and in particular to a disk drive having a disk clamp having a non-circular opening and a hub having a non-circular protrusion that is inserted into the non-circular opening.

BACKGROUND

Disk drives typically include a disk clamp that provides a disk clamping force for holding one or more disks to a hub. Thus, disk clamping is becoming more and more important not only for regular HDD performance but also under extreme conditions such as operational shock and non-operational shock. A reliable clamping force may maintain the integrity of the whole disk pack, preventing the disk from separating or sliding under shock event. A reliable clamping force also helps limit the disk deflection, avoiding the disk contact with other components including arms, cover, base and suspensions under low G shock.

With increasingly thinner HDD design, disk clamping design may become challenging due to limitations of smaller form factors.

There is therefore a need for an improved disk clamp.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
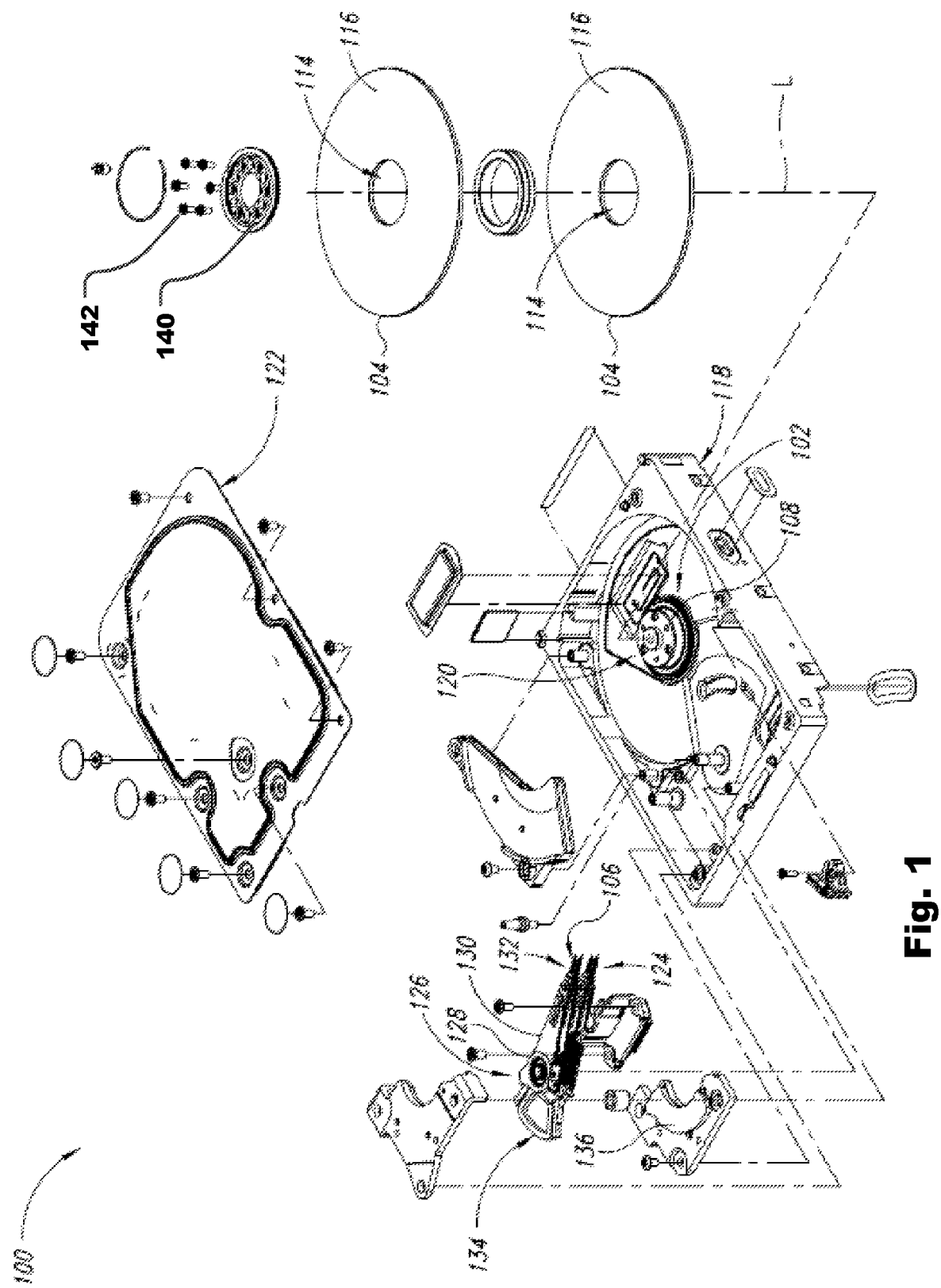
FIG. 1 is an exploded, perspective view generally illustrating a disk drive including an exemplary clamp and hub, according to an embodiment.

Referring to FIG. 1, a disk drive 100 is illustrated, according to one embodiment. The disk drive 100 comprises a hub 102, a disk 104 physically contacting and supported by at least one mounting surface of the hub 102, and a head 106 operable to write to and read from the disk 104. In one embodiment, the hub 102 comprises a substantially cylindrical portion 108 which define a longitudinal axis L and a mounting surface substantially normal to the longitudinal axis L, the mounting surface extending radially outward.

As illustrated herein, the disk drive 100 comprises a magnetic disk drive, and the structures and methods described herein will be described in terms of such a disk drive. However, these structures and methods may also be applied to and/or implemented in other disk drives, including, e.g., optical and magneto-optical disk drives.

The disks 104 may comprise any of a variety of magnetic or optical disk media having a substantially concentric opening 114 defined there through. Of course, in other embodiments, the disk drive 100 may include more or fewer disks. For example, the disk drive 100 may include one disk or it may include two or more disks. The disks 104 each include a disk surface 116, as well as an opposing disk surface not visible in FIG. 1. In one embodiment, the disk surfaces 116 comprise a plurality of generally concentric tracks for storing data.

As illustrated, the hub 102 may be coupled to and support the disks 104. The hub 102 may also be rotatably attached to a motor base 118 of the disk drive 100, and may form one component of a motor 120 (e.g., a spindle motor). The motor 120 and the hub 102 may be configured to rotate the disks 104 about the longitudinal axis L. As discussed in greater detail below, the hub 102 may comprise vertical and horizontal surfaces that form mounting surfaces or spaces between various components.

Further, a disk clamp 140 may be coupled to the hub 102 to provide a downward clamping force to the disks 104. Specifically, the disk clamp 140 may be positioned above the disks 104 and attached to an upper surface of the hub 102 by one or more screws 142. The interaction of the disk clamp 140 and the hub 102 to provide the downward clamping force is discussed in more detail below.

The disk drive 100 may further include a cover 122, which, together with the motor base 118, may house the disks 104 and the motor 120. The disk drive 100 may also include a head stack assembly ("HSA") 124 rotatably attached to the motor base 118. The HSA 124 may include an actuator 126 comprising an actuator body 128 and one or more actuator arms 130 extending from the actuator body 128. The actuator body 128 may further be configured to rotate about an actuator pivot axis.

One or two head gimbal assemblies ("HGA") 132 may be attached to a distal end of each actuator arm 130. Each HGA 132 includes a head 106 operable to write to and read from a corresponding disk 104. The HSA 124 may further include a coil 134 through which a changing electrical current is passed during operation. The coil 134 interacts with one or more magnets 136 that are attached to the motor base 118 to form a voice coil motor ("VCM") for controllably rotating the HSA 124.

The head 106 may comprise any of a variety of heads for writing to and reading from a disk 104. In magnetic recording applications, the head 106 may include an air bearing slider and a magnetic transducer that includes a writer and a read element. The magnetic transducer's writer may be of a longitudinal or perpendicular design, and the read element of the magnetic transducer may be inductive or magnetoresistive. In optical and magneto-optical recording applications, the head may include a mirror and an objective lens for focusing laser light on to an adjacent disk surface.

The disk drive 100 may further include a printed circuit board ("PCB") (not shown). The PCB may include, inter alia, a disk drive controller for controlling read and write operations and a servo control system for generating servo control signals to position the actuator arms 130 relative to the disks 104.

Figure 2:
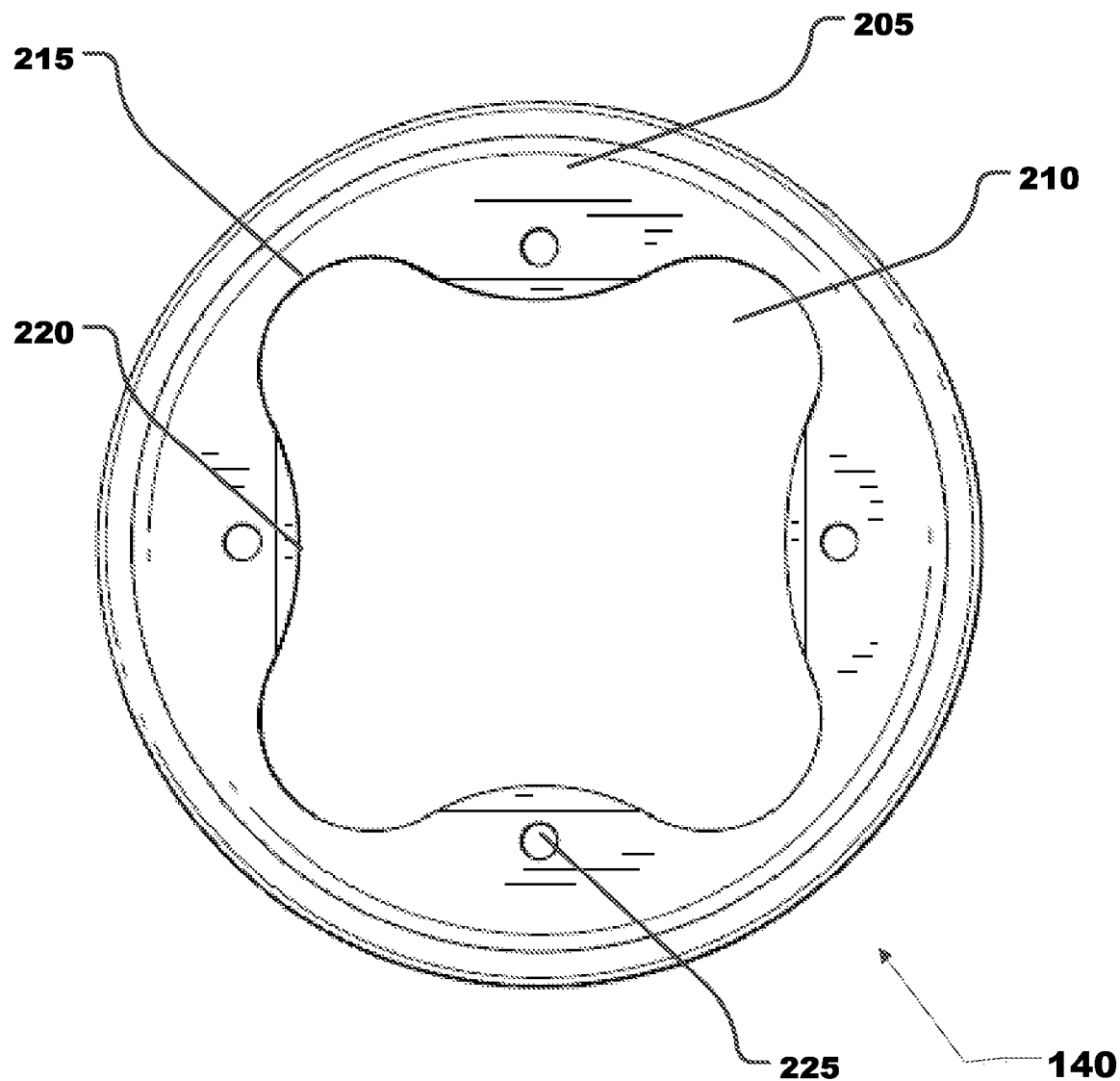
FIG. 2 is a top view illustrating a disk clamp of FIG. 1, according to an example embodiment.
Figure 3:
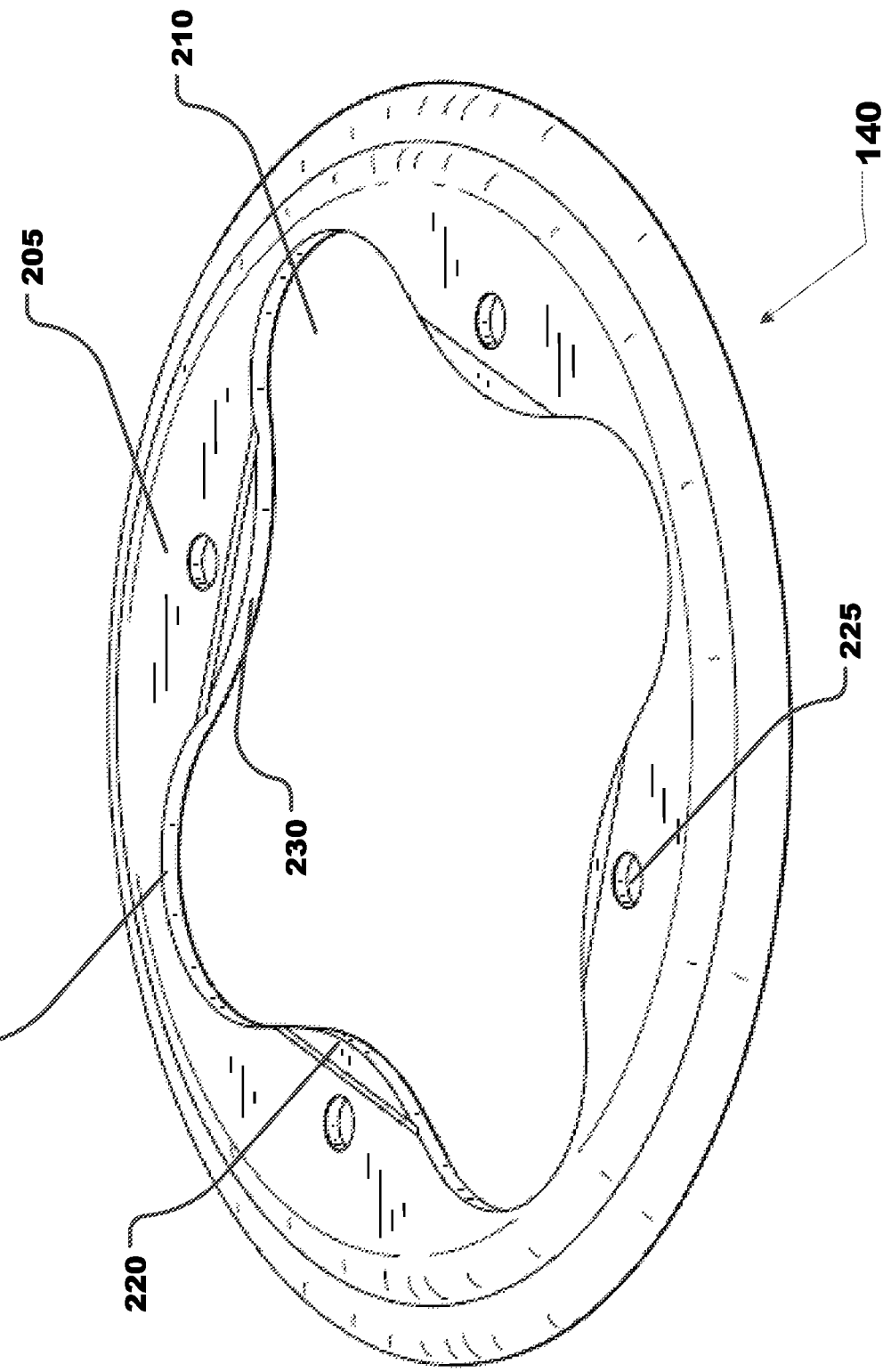
FIG. 3 is a perspective view illustrating the disk clamp of FIG. 1, according to an example embodiment.

FIG. 2 illustrates a top view of the clamp 140 according to an exemplary embodiment of the present application. FIG. 3 illustrates a perspective view of the clamp 140 according to exemplary embodiment of present application.

As illustrated, the disk clamp 140 has a substantially circular shape and comprises a wall portion 205 and a non-circular opening 210. As shown in FIG. 3, in one embodiment the noncircular opening traverses the entire thickness 230 of the disk clamp 140. In FIGS. 2 and 3, the non-circular opening 210 has a semi-rectangular shape which is configured to receive a similarly shaped non-circular protrusion formed on the hub 102 (discussed in more detail below). The semi-rectangular shape of the circular opening 210 is formed with curved corners 215 and concave regions 220, which curve inward along the sides of the semi-rectangular shape. This shape may reduce stress concentration within the clamp 140, which may occur if the corners are formed at right angles (90°). However, the non-circular opening 210 is not limited to this semi-rectangular shape and may have alternative shapes such as triangular, pentagonal, hexagonal, or octagonal, for example.

Further, in some embodiments, one or more holes 225 are formed through the wall portions 205 of the disk clamp 140 to receive a screw which attaches the disk clamp 140 to the disk hub 102 as discussed above.

Figure 4:
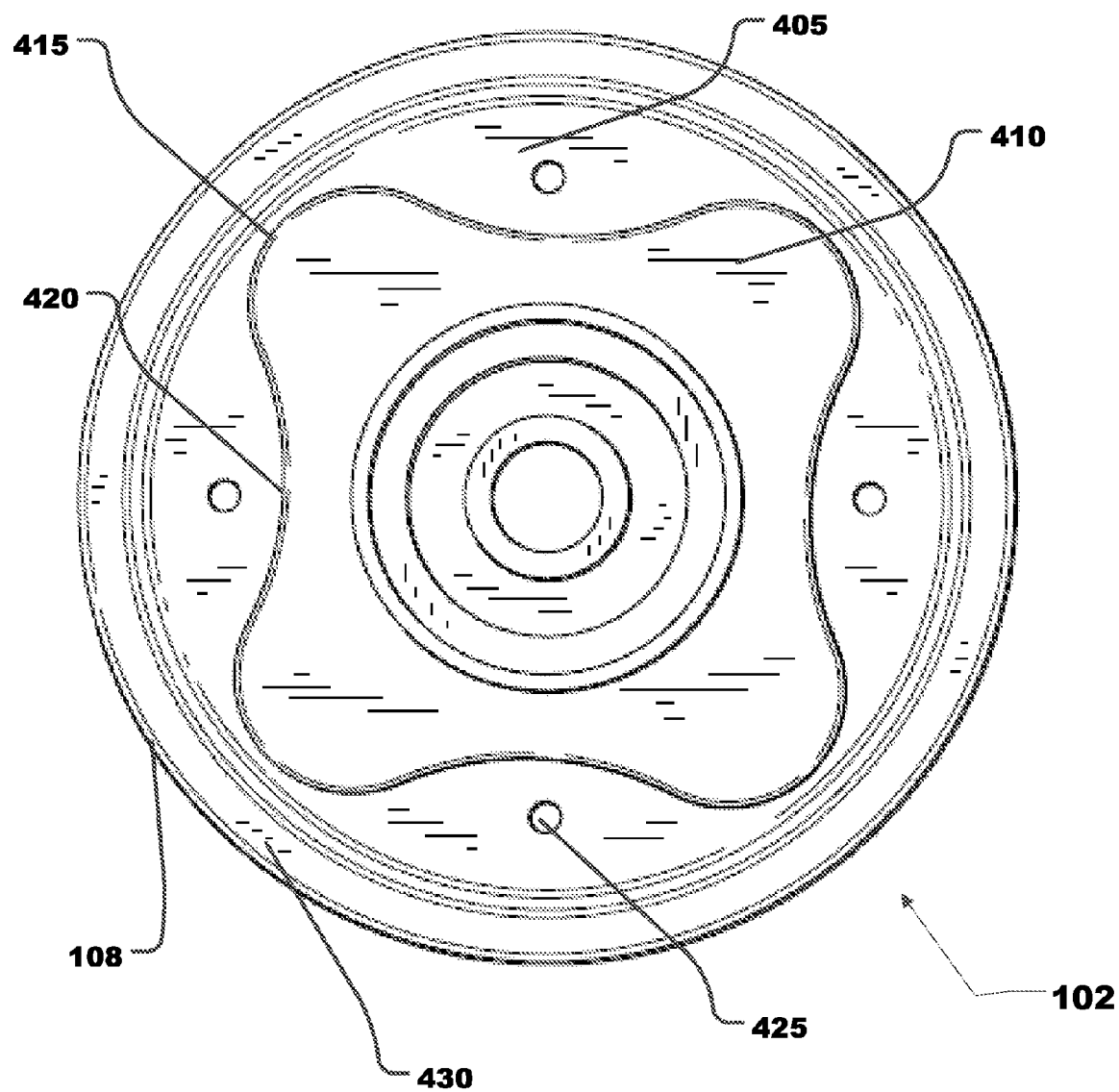
FIG. 4 is a top view illustrating the hub of FIG. 1, according to one example embodiment.

FIG. 4 illustrates a top view of the hub 102 according to an exemplary embodiment of the present application. As illustrated, the hub 102 comprises a cylindrical portion 108 and a mounting surface 430 on which as disk (not pictured in FIG. 4) may be mounted. Additionally, the hub 102 includes a top surface 405 on top of the cylindrical portion 108 of the hub 102. Further, the hub 102 also includes a non-circular protrusion 410, which extends upward from the top surface 405 on which the disk is mounted. In FIG. 4, the non-circular protrusion 410 has a semi-rectangular shape that is configured to be inserted into the similarly shaped non-circular opening 210 formed through the disk clamp 140. Further, similar to the non-circular opening 210 formed through the disk clamp 140 (shown in FIG. 3, not shown in FIG. 4), the non-circular protrusion 410 of the hub 102 is formed with curved corners 415 and concave regions 420, which curve inward along the sides of the semi-rectangular shape. Again, this shape may reduce stress concentration within the hub 102, which may occur if the corners are formed at right angles (90°). However, the non-circular protrusion 410 is not limited to this semi-rectangular shape and may have alternative shapes such as triangular, pentagonal, hexagonal, or octagonal, for example.

Further, in some embodiments one or more holes 425 may be formed in the top surface 405 of the cylindrical portion 108 of the hub 102 to receive a screw which attaches the disk clamp 140 to the disk hub 102.

Figure 5:
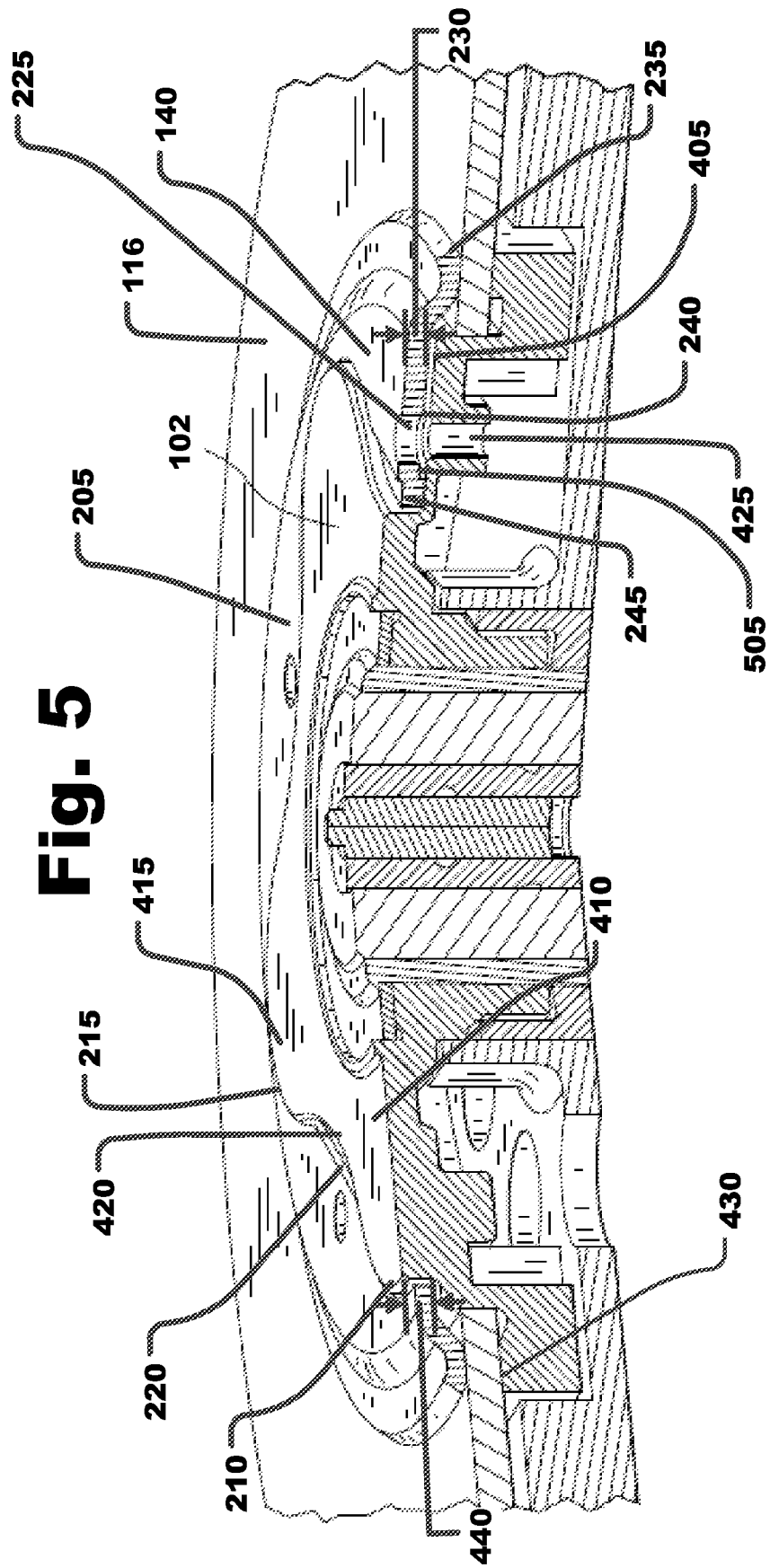
FIG. 5 is a partial section view of the disk clamp and hub of FIG. 1 assembled with a disk, according to a first example embodiment.

FIG. 5 is a partial section view of disk assembly including the disk clamp 140 and disk hub 102 according to a first example embodiment. As illustrated, a disk 116 mounted on the mounting surface 430 of the hub 102. Further, the disk clamp 140 is placed on top of the hub 102 to provide a downward clamping force to the disk 116. More specifically, the non-circular protrusion 410 of the hub 102 is inserted into the non-circular opening 210 of the disk clamp 140 such that the wall portion 205 of the disk clamp 140 rests on the top surface 405 of the hub 102. Further, the curved corners 215 and concave regions 220 of the disk hub 102 frictionally engage the curved corners 415 and concave regions 420 of disk clamp 140. Further, the screw holes 225 of the hub 102 are aligned with the screw holes 425 of the disk clamp 140.

In some embodiments, the disk clamp 140 has a thickness 230 that is less than or equal to a height 440 of the non-circular protrusion 410 of the hub 102. Thus, when the non-circular protrusion 410 of the hub 102 is inserted into the non-circular opening 210 of the disk clamp 140 an embedded structure is formed.

Further, the disk clamp 140 also includes an inner diameter lower region 245 which contacts the top of the top surface 405 of the disk hub 102 and an outer diameter lower region 235 which contacts the top surface of the disk 116. The outer diameter lower region 235 of the disk clamp 140 applies the downward clamping force to the disk 116. As shown in FIG. 5, in some embodiments the disk clamp 140 curves upward to provide a raised region 240 around the screw hole 225 of the disk clamp 140, and then curves downward to form the outer diameter lower region 235, which contacts the disk 116. This curvature creates an air gap 505 between the disk clamp 140 and disk 102 in the area around the screw holes 225 of the disk clamp 140. When a screw is inserted through the screw hole 225 of the disk clamp 140 and into the screw hole 425 of the hub 102 and tightened down the air gap 505 is compressed, and greater clamping force may be applied to the disk 116 by outer diameter lower region 235 of the disk clamp 140.

Figure 6:
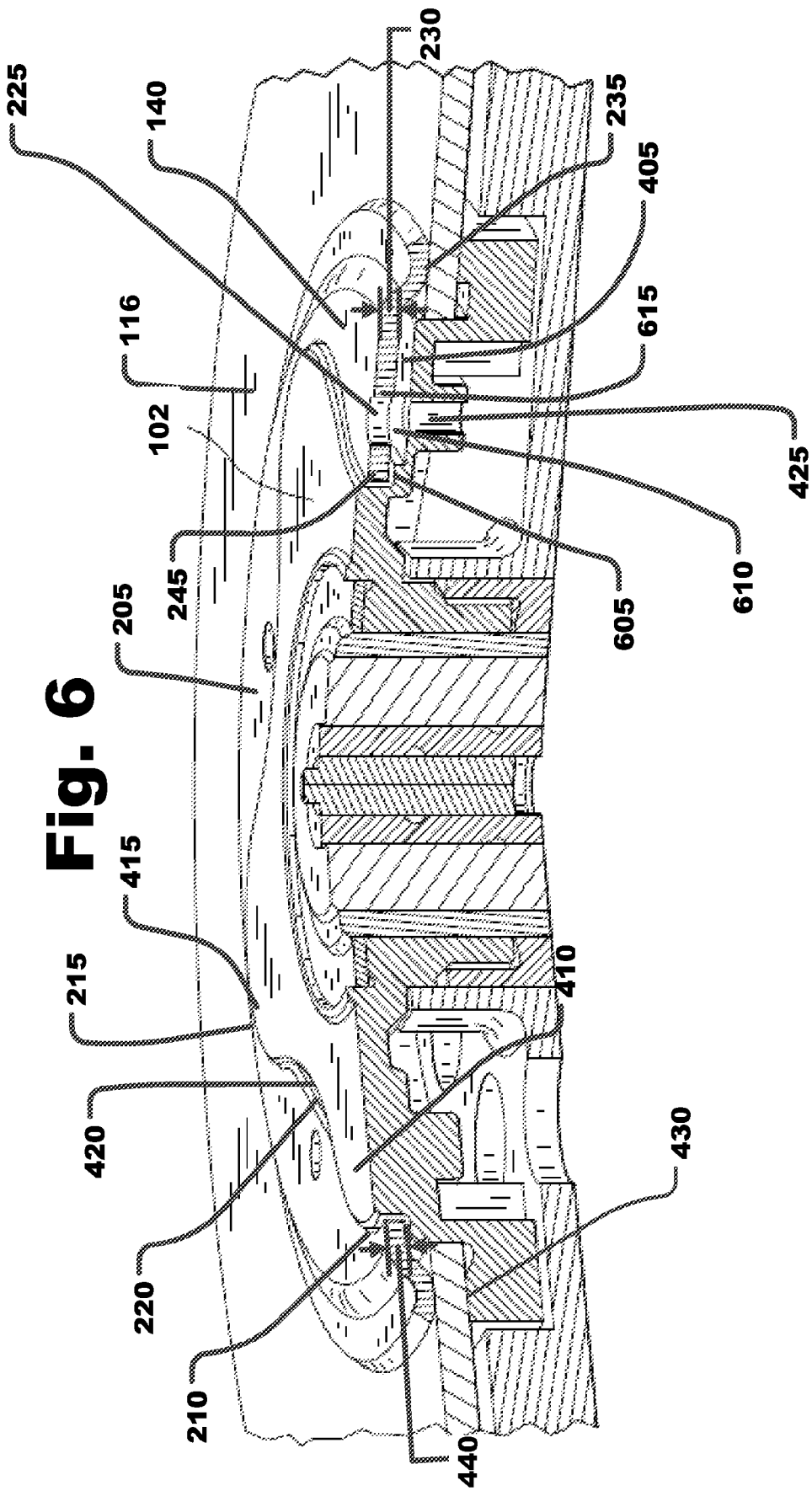
FIG. 6 is a partial section view of the disk clamp and hub of FIG. 1, according to a first example embodiment.

FIG. 6 is a partial section view of disk assembly including the disk clamp 140 and disk 102 according to a second example embodiment. This second embodiment is similar to the first embodiment discussed above and thus redundant description is minimized. Briefly, a disk 116 mounted on the mounting surface 430 of the hub 102 and a disk clamp 140 is placed on top of the hub 102 to provide a downward clamping force to the disk 116. Again, the non-circular protrusion 410 of the hub 102 is inserted into the non-circular opening 210 of the disk clamp 140 such that the curved corners 215 and concave regions 220 of the disk hub 102 frictionally engage the curved corners 415 and concave regions 420 of disk clamp 140.

Further, in this second embodiment, the disk hub 102 also includes a step 605, which is formed on the top surface 405 of the disk hub 102. This step 605 is disposed next to or proximate to the noncircular protrusion 410 which extends upward from the top surface 405 of the disk hub 102. Again, the disk clamp 140 includes an inner diameter lower region 245 and in this second embodiment, the inner diameter lower region 245 sits on top of this step 605 of the disk hub 102 when disk clamp 140 is mounted onto the disk 102. The disk clamp 140 also includes an outer diameter lower region 235 which contacts the top surface of the disk 116. The outer diameter lower region 235 of the disk clamp 140 applies the downward clamping force to the disk 116.

As shown in FIG. 6, the step 605, on which the inner diameter lower region 245 sits, provides an air gap 610 between the disk clamp 140 and disk hub 102 around the screw hole 225 of the disk clamp 140. In some embodiments, the disk clamp 140 then curves downward from the area 615 around the screw hole 225 toward the outer diameter lower region 235, which contacts the disk 116. When a screw is inserted through the screw hole 225 of the disk clamp 140 and into the screw hole 425 of the hub 102 and tightened down the air gap 610 is compressed, and greater clamping force may be applied to the disk 116 by outer diameter region lower 235 of the disk clamp 140.

Figure 7:
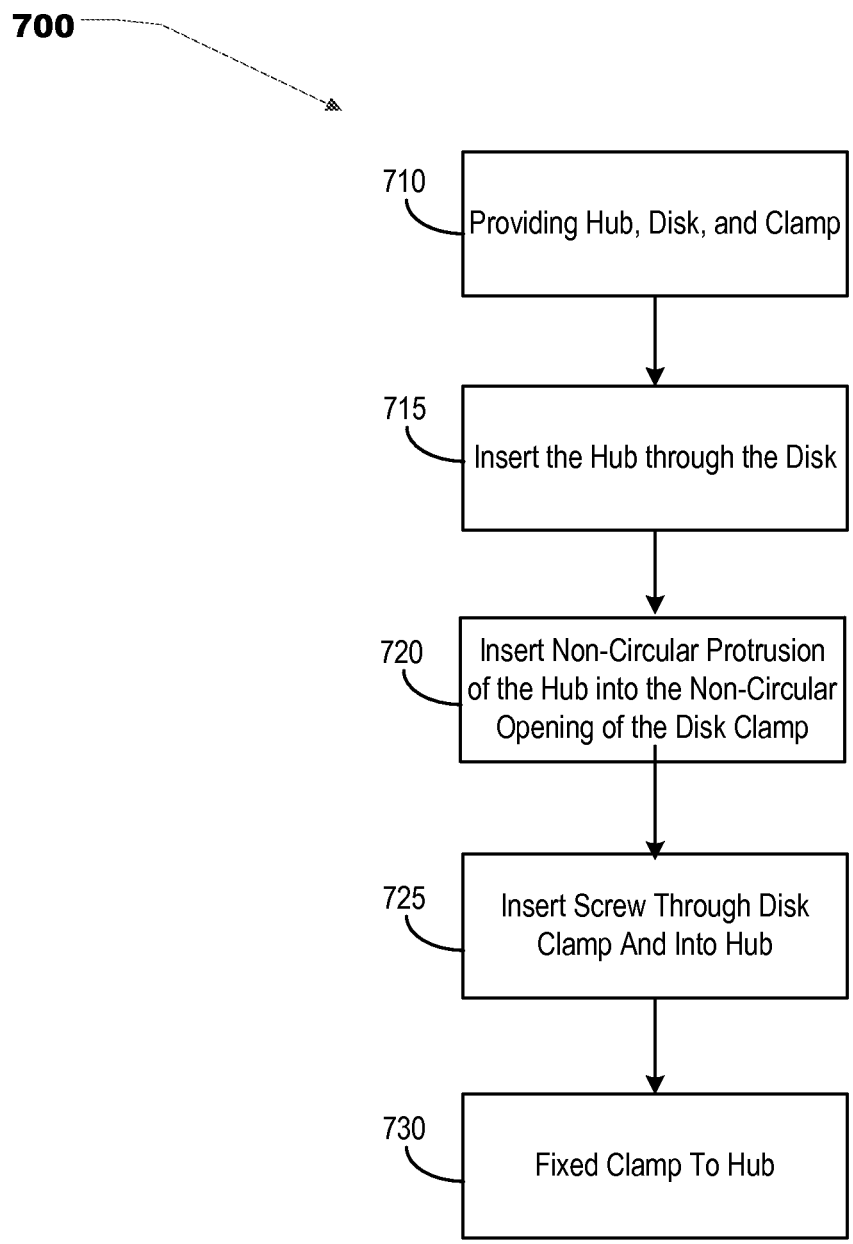
FIG. 7 illustrates a flowchart for a method of manufacturing a disk drive, according to one or more example embodiments.

FIG. 7 illustrates a flow chart for a method 700 of manufacturing a disk drive, according to one illustrated embodiment. This method 100 will be discussed in the context of the hub 102 and disk clamp 140 of FIGS. 1-6. However, the acts disclosed herein may be executed using a variety of different disk drive hubs and clamps, in accordance with the described method.

As described herein, at least some of the acts comprising the method 700 may be orchestrated by a processor according to an automatic disk drive manufacturing algorithm, based at least in part on computer-readable instructions stored in computer-readable memory and executable by the processor. A manual implementation of one or more acts of the method 700 may also be employed, in other embodiments.

At act 710, a hub 102, a disk 116 and disk clamp 140 are provided. The disk 116 may define an opening there through having an inner diameter. The disk 116 may be formed in a variety of ways. In one embodiment, the media of the disk 116 may be formed, and then the first disk 116 may be stamped or otherwise machined to define the first opening.

The hub 102 may define a mounting surface 430, a top surface 405 and a non-circular protrusion 410. As discussed above, in some embodiments, the non-circular protrusion 410 has a semi-rectangular shape having curved corners 415 and concave indentations 420 along the sides of the semi-rectangular shape. Additionally, the hub 102 also has one or more holes 425 formed in the top surface to receive a screw.

The hub 102 may also be formed in a variety of ways. In one embodiment, the hub 102 may be machined to form the mounting surface 430, and non-circular protrusion 410. In other embodiments, the first hub 102 may be cast, molded or machined to form the mounting surface 430. And the non-circular protrusion 410. In still other embodiments, other manufacturing techniques may be employed.

The disk clamp 140 may have a wall portion 205 and a non-circular opening 210 formed there through. As discussed above, in some embodiments, the non-circular opening 210 has a semi-rectangular shape having a curved corners 215 and concave indentations to 20 along the sides of the semi-rectangular shape. Additionally, the disk clamp 140 may also have one or more holes 225 formed there through to allow a screw to be through inserted through the disk clamp.

Similar to the hub 102, the manufacturing method of the disk clamp 140 is not particularly limited and may include machining, casting, molding, or any other methods as would be apparent to a person of ordinary skill in the art.

At act 715, the disk 116 is positioned against the mounting surface 430 of the hub 102. The disk 116 may be positioned in physical contact with the mounting surface 430. In some embodiments, a machine vision system may help align the disk 116 and the mounting surface 430 of the hub 102. Alternatively, alignment between the disk 116 and the hub 102 may be done manually by a human technician.

At act 720, the disk clamp 140 is positioned onto the hub 102 by the non-circular protrusion 410 of the hub 102 being inserted into the non-circular opening 210 of the disk clamp 140. The disk clamp 140 is positioned such that the wall portions 205 of the clamp 140 contact the top surface of the hub 102. Additionally, the curved corners 215 and concave regions 220 of the non-circular opening 210 of the clamp 140 frictionally engage the curved corners 415 and the concave regions 420 of the non-circular protrusion 410 of the hub 102. Further, the screw holes 225 of the clamp 140 are aligned with the screw holes 425 of the hub 102. In some embodiments, a machine vision system may help align the clamp 140 and the hub 102. Alternatively, alignment between the clamp 140 and the hub 102 may be done manually by a human technician.

At act 725, a screw 142 is inserted through the screw hole 225 of the clamp 140 and into the screw holes 425 of the hub 102. An alternative fastener, such as a bolt, rivet, or peg for example, may be used instead of the screw 142. In some embodiments, a machine vision system may help with the insertion of the screw 142. Alternatively, screw insertion may be performed manually by a human technician.

At act 730, the screw 142 is tightened down so that the disk clamp 140 is compressed to provide a clamping force to the disk 116, coupling the disk 116 to the hub 102.

In some embodiments, multiple disks may be positioned against and coupled to the hub 102 with spacers formed there between.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

The invention claimed is:

1. A disk drive comprising:
   a hub comprising a top surface and a non-circular protrusion extending upward from the top surface, wherein a first screw hole is formed in the top surface of the hub;
   a disk clamp comprising a wall portion and a non-circular opening formed through the clamp, the opening configured to receive the non-circular protrusion extending upward from the top surface of the hub, wherein a second screw hole is formed through the wall portion of the disk clamp, and
   wherein the second screw hole formed through the disk clamp is substantially aligned with the first screw hole formed in the top surface of the hub; and
   at least one disk supported by the hub,
   wherein the non-circular protrusion extending upward from the top surface of the hub is inserted into the opening formed in the clamp, and
   wherein an outer annular portion of the clamp engages the disk to provide clamping force; and
   wherein the disk clamp further comprises:
   an inner lower region that contacts the top surface of the hub;
   an outer lower region that contacts the disk to provide the clamping force; and
   a raised region proximate to the second screw hole formed through the wall portion of the disk clamp, the raised region forming an air gap between the disk clamp and the hub.

2. The disk drive according to claim 1, wherein the non-circular opening of the disk clamp is sized and shaped to frictionally engage the non-circular protrusion of the hub extending upward from the top surface of the hub.

3. The disk drive according to claim 1, wherein the disk clamp has a thickness less than or equal to a height of the non-circular protrusion.

4. The disk drive according to claim 1, wherein the disk clamp is at least partially embedded within the hub when the non-circular protrusion of the hub is inserted into the non-circular opening of the disk clamp.

5. The disk drive according to claim 1, wherein the non-circular protrusion of the hub and the non-circular opening of the clamp each have a semi-rectangular shape.

6. The disk drive according to claim 5, wherein each of the non-circular protrusion of the hub and the non-circular opening of the clamp comprises at least one side having a concave region formed in the at least one side.

7. The disk drive according to claim 1, wherein each of the non-circular protrusion of the hub and the non-circular opening of the clamp comprises at least one rounded corner.

8. The disk drive according to claim 1, wherein each of the non-circular protrusion of the hub and the non-circular opening of the clamp comprises at least one side having a concave region formed in the at least one side.

9. A disk drive comprising:
a huh comprising a top surface and a non-circular protrusion extending upward from the top surface, wherein a first screw hole is formed in the top surface of the hub;
a disk clamp comprising a wall portion and a non-circular opening formed through the clamp, the opening configured to receive the non-circular protrusion extending upward from the top surface of the hub, wherein a second screw hole is formed through the wall portion of the disk clamp, and
wherein the second screw hole formed through the disk clamp is substantially aligned with the first screw hole formed in the top surface of the hub; and
at least one disk supported by the hub,
wherein the non-circular protrusion extending upward from the top surface of the hub is inserted into the opening formed in the clamp, and
wherein an outer annular portion of the clamp engages the disk to provide clamping force; and
wherein the disk hub further comprises a step formed on the top surface proximate to the non-circular protrusion; and the disk clamp further comprises:
an inner lower region that contacts the step formed on the top surface of the hub;
an outer lower region that contacts the disk to provide the clamping force;
wherein the step formed on the top surface causes an air gap to be formed between the disk clamp and the hub in a region proximate to the second screw hole formed through the wall portion of the disk clamp.

10. A hub for a disk drive comprising:
a top surface;
a non-circular protrusion extending upward from the top surface, wherein the non-circular protrusion is configured to be inserted into an opening of a clamp for a disk drive;
a screw hole formed in the top surface of the hub; and
a step formed on the top surface proximate to the non-circular protrusion,
wherein the step formed on the top surface causes an air gap to be formed between the clamp and the hub in a region proximate to the screw hole formed in the top surface of the hub.

11. The hub according to claim 10, wherein the non-circular protrusion of the hub has a semi-rectangular shape.

12. The hub according to claim 10, wherein the non-circular protrusion of the hub comprises at least one rounded corner.

13. The hub according to claim 12, wherein the non-circular protrusion of the hub comprises at least one side having a concave region formed in the at least one side.

14. The hub according to claim 10, wherein the non-circular protrusion of the hub comprises at least one side having a concave region formed in the at least one side.

15. A clamp for a disk drive comprising:
a wall portion;
a non-circular opening formed through the clamp, the opening configured to receive a protrusion extending from a hub of a disk drive;
a screw hole formed through the wall portion of the disk clamp;
wherein the clamp further comprises:
an inner lower region configured to contact a top surface of the hub;
an outer lower region configured to contact a disk to provide a clamping force; and
a raised region proximate to the screw hole formed through the wall portion of the disk clamp, the raised region configured to form an air gap between the disk clamp and the hub.

16. The clamp according to claim 15, wherein the non-circular opening of the clamp has a semi-rectangular shape.

17. The clamp according to claim 15, wherein the non-circular opening of the clamp comprises at least one rounded corner.

18. The clamp according to claim 17, wherein the non-circular opening of the clamp comprises at least one side having a concave region formed in the at least one side.

19. The clamp according to claim 15, wherein the protrusion of the hub comprises at least one side having a concave region formed in the at least one side.

* * * * *